INVENTORS
NED S. RASOR
ROBERT L. HIRSCH

BY

ATTORNEY

INVENTORS
NED S. RASOR
ROBERT L. HIRSCH

BY

ATTORNEY

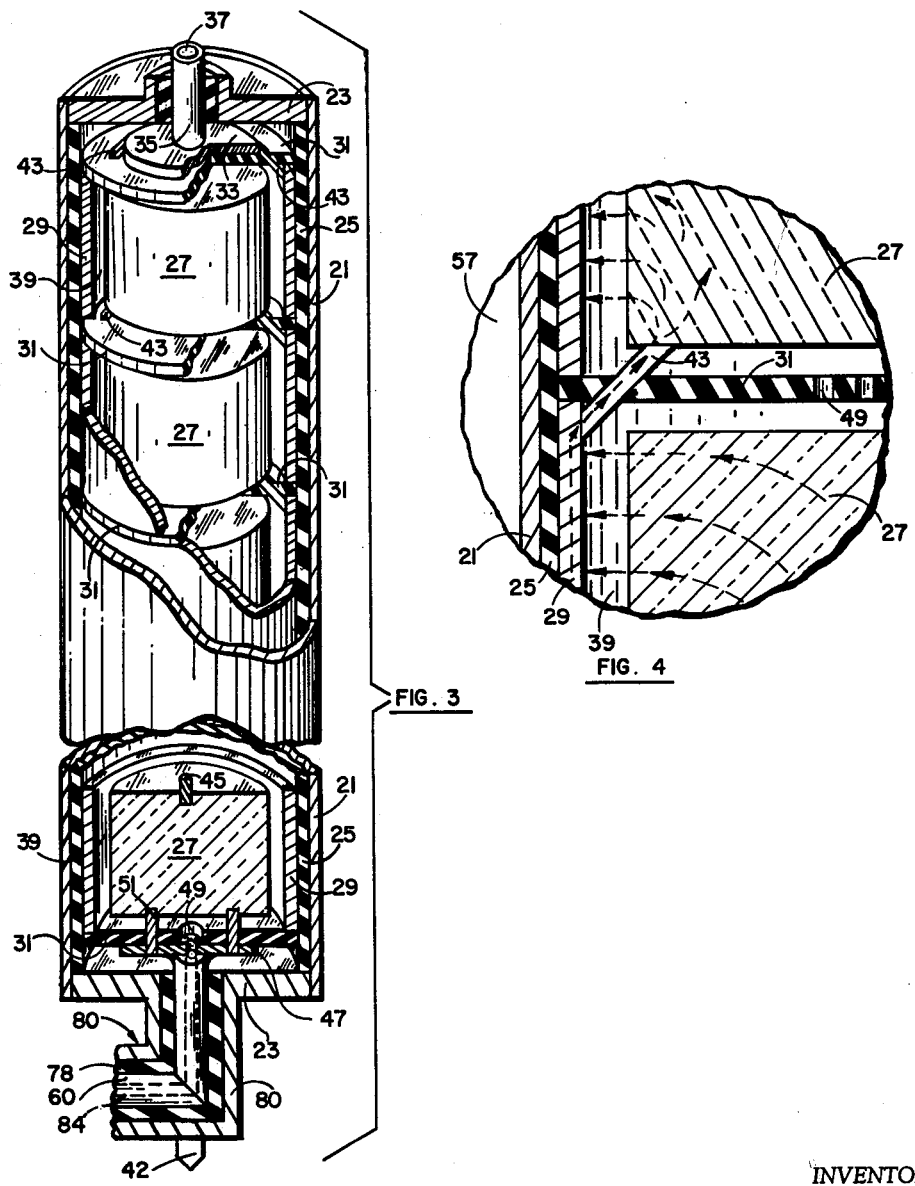

INVENTORS
NED S. RASOR
ROBERT L. HIRSCH

United States Patent Office 3,113,091
Patented Dec. 3, 1963

3,113,091
NUCLEAR REACTOR AND THERMIONIC FUEL
ELEMENT THEREFOR
Ned S. Rasor and Robert L. Hirsch, Northridge, Calif.,
assignors, by mesne assignments, to the United States
of America as represented by the United States Atomic
Energy Commission
Filed June 23, 1960, Ser. No. 38,297
5 Claims. (Cl. 204—193.2)

The present invention is directed to nuclear reactors and primarily to nuclear reactors wherein the heat from the fissioning material is converted directly into electricity.

Nuclear reactors operating at high temperatures and high specific powers have large temperature gradients which can be utilized in accordance with the present invention for developing electrical power directly from the core without the usual turbine-generator system. Such direct conversion reactor systems can be very compact, light in weight, and reliable, due to an absence of moving parts. While also useful with a turbine-generator system, these systems meet the need for small compact power sources for space exploration, submarine propulsion, and various other portable applications.

Therefore, it is the general object of the present invention to provide a nuclear reactor system utilizing direct conversion of heat to electricity. It is another object of the present invention to provide a small compact nuclear reactor in which fission heat is converted directly to electricity.

It is a further object of the present invention to provide a core arrangement for a direct conversion nuclear reactor in which the fission gases released from the fuel are vented outside of the core.

A further object of the present invention is to provide a thermionic fuel element for use in a thermal, intermediate, or fast reactor.

A further object of the present invention is to provide a thermionic fuel element in which the fissionable material is a cathode.

A still further object of the present invention is to provide a thermionic fuel element in which the fissionable material is divided into a plurality of cathodes each electrically insulated from the others.

A still further object of the present invention is to provide a thermionic fuel element consisting of a plurality of interconnected diodes, in which the cathode of each diode is a portion of the fissionable material of the fuel element.

Another object of the present invention is to provide a thermionic fuel element where one element of each diode is structurally supported by and electrically connected to an element of the adjacent diode.

These and other objects of the present invention will be more apparent from the following detailed description and drawings, hereby made a part hereof, in which:

FIGURE 3 is a partially sectioned perspective view of the fuel element utilized in the reactor of FIGURE 1;

FIGURE 4 is a partially sectioned perspective view showing the details of the thermionic fuel element;

Figure 1:
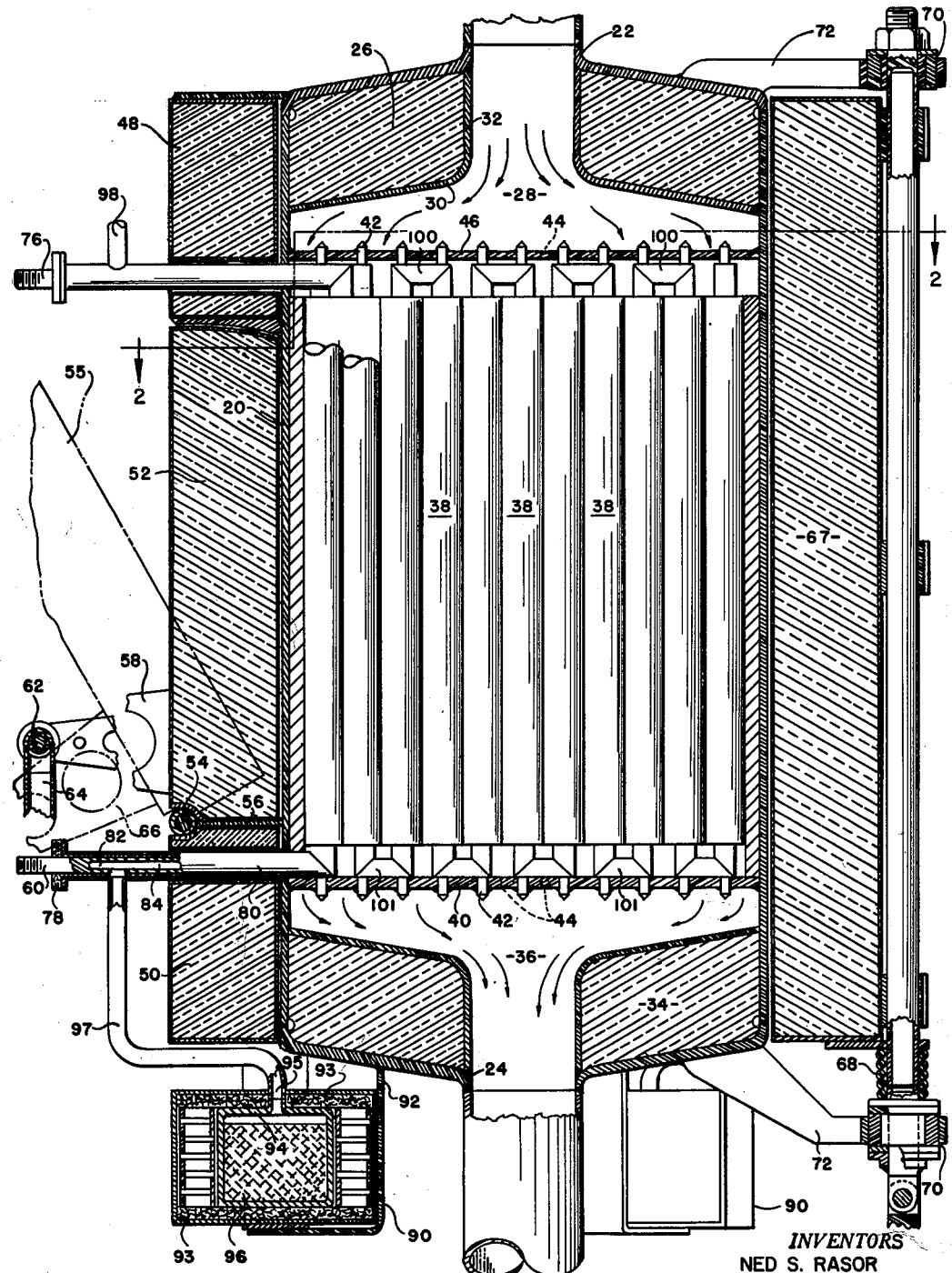
FIGURE 1 is a vertical cross-sectional view of the reactor of the present invention.

Referring now to FIGURE 1 specifically, the reactor of the present invention comprises a pressure vessel 20 having a top coolant inlet 22 and a bottom coolant outlet 24. Supported within the vessel 20 and in its upper portion adjacent inlet 22 is a top reflector 26, cylindrical in shape and sealed from the inlet plenum 28 by covering 30 which is welded to the inner surface of vessel 20. The top reflector 26 has a central aperture 32 forming an extension of inlet 22. A similar bottom reflector 34 is integrally sealed to the vessel 20 and has an aperture connecting the outlet plenum 36 with the coolant outlet 24. Within the main volume of the vessel 20 are a plurality of thermionic fuel elements 38 which are supported at the bottom by bottom grid plate 40 attached to vessel 20 and into which pins 42 of the fuel element 38 extend and are preferably welded. The bottom grid plate has a plurality of coolant passage apertures 44. The tops of the fuel elements 38 are also provided with pins 42 which extend through the top grid plate 46. The top grid plate 46 is welded to vessel 20 so that the fuel elements are maintained in parallel arrangement. The pins 42 are preferably slidable within the top grid plate 46 to allow for thermal expansion. The fuel elements 38 are preferably supported in peripheral contact with adjacent fuel elements, although some space may be left between adjacent fuel elements for coolant flow if desired.

The vessel 20 is enclosed in a reflector having several stationary and several pivotal parts. To maintain minimum weight, the reactor reflector is preferably beryllium oxide impregnated with a suitable thermal neutron poison to decrease power peaking in the outer core regions for the fast reactor of the preferred embodiment of FIGURE 1. The fast reactor embodiment is preferred, since the addition of moderator to this system would increase core size and weight; however, fuel inventory is increased for this embodiment.

To obtain a highly efficient system all converters should operate near optimum conditions, which are a function of position within the core. Therefore, once a desirable neutron flux distribution is established within the reactor, it must not be perturbed. Since control rods utilized in thermal reactors create large local flux perturbations, they are undesirable and reflector control is utilized. However, reflector changes in a highly thermal reactor will create large local flux perturbations due to the short mean free path of thermal neutrons. In an epithermal or fast reactor, however, the mean free paths of the fast neutrons are the order of the core size, and reflector control minimizes power perturbation. Further, in the fast reactor embodiment reactor material selection is not as limited.

Sections 48 and 50 are permanent upper and lower reflector portions in between which the pivotal control section 52 is located. The control section 52 pivots about pin 54 which is supported by bracket 56 welded to the vessel 20. The outer position 55 is shown in phantom in FIGURE 1. As is apparent from FIGURE 2, three pivotal sections 52 are provided around the periphery of the vessel 20. Each section 52 is connected to a pair of levers 58. The levers are spaced apart to avoid interference with the electrical outlets 60 and the spacing is maintained on the pivot pin 62 by a spacer 64. Pivotally connected to the pivot 62 is control arm 64 which is movable vertically by a piston or other actuating mechanism (not shown) so that the bracket is moved to the second position 66 shown in phantom corresponding to the position 55 of the control reflector 52. In this manner, with the three sections 52 moved to their outer position, the core is subcritical.

Intermediate between the three pivotal reflector control sections are three rotatable fine control segments 67, preferably consisting of reflector material, which are supported for rotation on a vertical shaft 68 rotatably supported in bearing assembly 70 at its upper and lower ends. The bearing assemblies 70 are supported by brackets 72 attached to the vessel 20. The shafts 68 are welded or otherwise firmly attached to the segments 67, and are driven by motors or other actuators, not shown, to adjust the reactivity of the core. The segments 67 are rotatable to the position 74 (see FIGURE 2) shown in phantom. Thus both fine (segment 67) and course (sections 52) control are provided by reflector movement and no control rods are required. However, it is within the purview of the present invention to utilize burnable poisons for reactivity compensation if desired.

The thermionic fuel elements, described in detail hereinafter, are preferably divided into two groups and each group composes a separate electrical system. However, a single group or more than two groups may be provided. Each of the two circuits of the preferred embodiment consists of series-connected thermionic fuel elements, each circuit having its own ionizable gas source and electrical connections. One side of the electrical connection of one of the groups is shown at 60, with the other side at 76. The lead 60 is enclosed in an insulator 78, both of which extend through the stationary reflector portion 50, vessel 20, and into the fuel element 38. The insulator 78 is enclosed in a metal sheath 80 which is welded to the vessel 20 and is of the same material as the fuel element cladding described hereinafter. This lead, insulator, and cladding combination interconnects the fuel elements of the first group in series relationship with the output terminal being indicated at 76 and being connected to the fuel elements and vessel in the same manner as lead 60. The lead 60 has a hollow center 82 which hollow connects with the interior of each fuel element in series so that a continuous passage 84 through all of the fuel elements of the group is provided. The purpose of passage 84 is to provide a means of passing an ionizable gas through all of the fuel elements of the group for use in the thermionic process described hereinafter and to sweep released fission product gases from the fuel elements. The gas source indicated generally as 90 consists of a sealed housing 91, supported on a bracket 92 which is attached to the bottom of the vessel 20. Within the housing 91 is an upper and lower layer of insulation 93 and a vapor vessel 94 having a vapor outlet 95. Within the vessel 94 is a porous block 96 containing a liquid, the vapor of which forms the ionizable gas. Preferably cesium is used, but other liquids known in the art may also be used. The annular volume between the vessel 94 and the housing 91 contains a heater and cooler 99, preferably of the thermoelectric type. The outlet 95 for the vapor is connected through duct 97 to passage 84, which passes through all the fuel elements of the group and has an outlet 98 in lead 76. The outlet 98 may be vented or connected to an absorber (not shown) for fission gases and cesium vapor. An orifice in the outlet provides an impedance to the flow of cesium vapor which is much greater than the flow impedance offered by the flow path through the remainder of the cesium vapor circuits. This ensures that no significant drop in cesium pressure exists within the cesium circuit due to the gas flow. Thus, the cesium reservoir and pressurizer consists essentially of liquid cesium in a porous block which is maintained at a specific temperature. Because the temperature of the block is cooler than any other area in the gas system, the system cesium pressure corresponds to the vapor pressure of the cesium at the reservoir temperature. Variations in this reservoir temperature can also be utilized as a means of control since converter output is very sensitive to cesium pressure.

Figure 2:
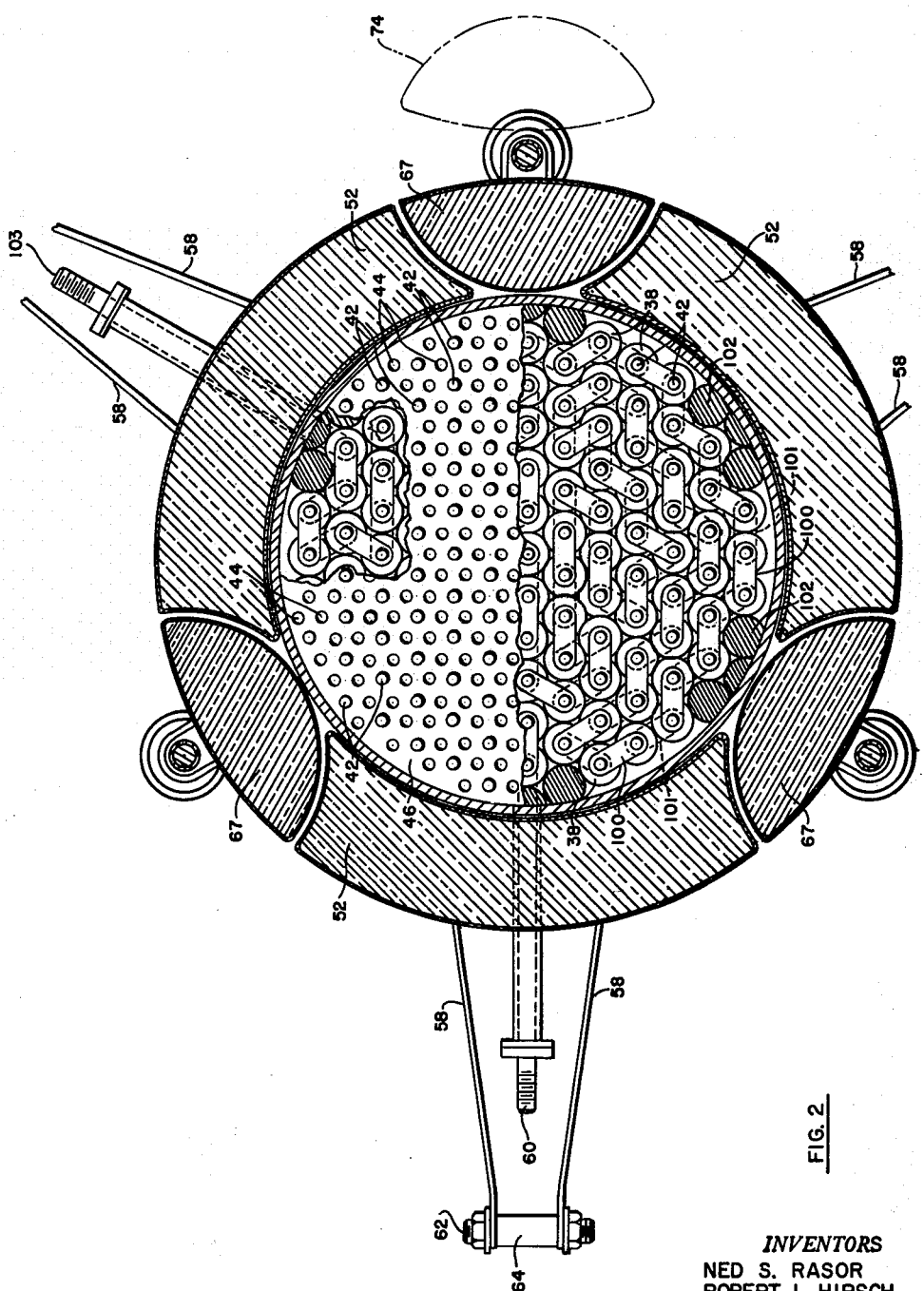
FIGURE 2 is a horizontal cross-sectional view of the reactor of the present invention along line A—A of FIGURE 1.

Referring now more specifically to FIGURE 2, the core consists of a plurality of fuel elements 38 which are interconnected in a series system. This interconnection is particularly apparent in FIGURE 2 where the cross ducts 100 interconnect the top of pairs of fuel elements and cross ducts 101 interconnect the bottoms of each element of two pairs to form a series duct connection. The ducts 100 and 101 consist of an outer cladding material 80, an electrical insulator 78, and a hollow tube electrical conductor 60. The volumes around the periphery of the fuel element cluster may be filled with reflector rods 102 to balance the flow of coolant, sodium in the preferred embodiment.

In the preferred embodiment a second group of nine fuel elements is series connected and constitutes a second circuit. This second circuit is utilized to obtain high amperage, low voltage (3 volt) electricity for a Faraday electro-magnetic pump for circulating the sodium coolant. The electrical connection 103 and the corresponding lead at the top (not shown) constitute the second circuit electrical leads. The connection 103 is the same as the lead 60, except that a heavier electrical lead is required to accommodate the higher currents. Parallel connected fuel elements may also be utilized for high current, low voltage output requirements, if desired.

The thermionic fuel element utilized in the preferred embodiment is shown in FIGURES 3 and 4 and is composed of an outer sleeve 21, inert with respect to the coolant flowing along its outside surface, which has end caps 23 welded or otherwise sealing the ends of sleeve 21. The sleeve 21 is thermally bonded to anode insulation sleeve 25 which extends from top cap 23 to bottom cap 23 and covers the entire inner surface of sleeve 21. In the preferred embodiment sleeve 21 is constructed of molybdenum and anode insulator 25 is fabricated of $Al_2O_3$. However, for coolants other than the sodium of the preferred embodiment, where insulator 25 is compatible with the coolant, e.g., gas, the sleeve 21 may be omitted, since its sole purpose is to prevent interaction between the coolant and insulator 25. Similarly, if the coolant is not an electrical conductor, the insulation sleeve 25 may be omitted. The sleeves 21 and 25 are preferably in the shape of cylinders of circular cross section; however, other geometric forms, e.g., slotted cylinder, square, rectangle, etc., may also be utilized.

Within the volume defined by the insulator sleeve 25 and end caps 23 are located the cathodes 27, anodes 29, and intercell insulators 31. In the embodiment shown in FIGURE 3 an intercell insulator 31 is located in spaced relation from the top end cap 23 by a conducting disk 33 which is connected to the electrical output lead 35 of the thermionic fuel element.

The output lead is a hollow cylinder; the central aperture 37 communicates with holes through disk 33 and insulator 31 so that the volume 39 between the cathode 27 and anode 29 of the top diode is connected to aperture 37. The intercell insulators 31 prevent electrons emitted by a cathode 27 from reaching the adjacent cathode, thereby short-circuiting the cells. Each of the intercell insulator disks 31 is provided with vapor passages 41 (see FIGURE 4) which are large enough to permit free passage of gas through the entire series of cells, but small enough to permit only negligible intercell short circuit current. Since the intercell insulator 31 must maintain its integrity at very high temperature, in the preferred embodiment it would be fabricated of BeO. The conducting disk 33 is connected through a plurality of supporting leads 43 passing through insulator 31 to the anode of the last diode. The cathode of the last diode cell in the element is connected and supported in spaced relation to the anode of the adjacent cell and the insulator disks 31 by leads 43. Additional lateral support may be obtained for the cathode 27, such as by providing a pin 45 which fits within a corresponding hole in insulator disks 31.

The output lead 35 is connected to the anode 29 in the element of FIGURE 3 and the input lead 60 is connected through a conducting input disk 47 having an aperture connecting passage 84 through the aperture 49 in the insulator disk 31 to the volume surrounding the cathode 27. The electrical connection between the conducting input disk 47 and the cathode 27 is made by means of at least one conducting support 51 which may extend into the cathode 27 to more readily diffuse electrons into the cathode. In this manner the input lead 60 and output lead 35 are connected through a series of diodes in which cathodes are supported by and electrically connected to the anode of the previous diode.

The output lead 35 is connected to the input of the next adjacent fuel element, where the input of the adjacent element is at the top. Thus the adjacent fuel element would be identical to that shown in FIGURE 3, except that it would be physically upside down with input lead 60 at the top and output 35 at the bottom. The cathodes 27 in this case would be suspended by the heavy leads 43. Thus all components of the fuel element are supported against axial or lateral movement by welding, brazing, or abutting relationship with the adjacent components.

FIGURE 4 shows a detail of the cathode support arrangement and the flow of electrons. The electrons thermionically emitted from cathode 27 flow across interelectrode space 39, which contains cesium vapor for space charge neutralization, to the anode 29, then through the heavy connecting and supporting lead 43 to the cathode 27 of the adjacent diode, etc. The electron flow from cathode to anode is primarily dependent upon the absolute temperature of the cathode and secondarily on the thermal gradient between the hot cathode (3600° F. surface temperature) and the cold anode (1400 to 1600° F.). The anode is cooled by coolant 57 passing over the sleeve 21 which is electrically but not thermally insulated from the anode by insulator 25, preferably fabricated from $Al_2O_3$. The cathode is preferably UC-ZrC and the anode copper. The sleeve 21 material, where necessary, may be any material compatible with the coolant. In the preferred embodiment where sodium is the coolant, molybdenum is preferred, but a selection may be made from such materials as Armco iron, 18–8 stainless steel, 310 stainless steel, nickel, Inconel, Nichrome, columbium, tantalum, tungsten, chromium, Hastelloy. The cathode connections may be made by either bonding the parts together or by casting them as one. Materials such as Mo, Ta, W, or Ir may be used. BeO, MgO, or $ZrO_2$ may be substituted for the $Al_2O_3$ insulator. BeO is preferred, but $Al_2O_3$ is used because of ease in fabrication. Anodes, preferably of copper, are connected by welding to the inter-diode lead 43 with a metal such as nickel. The anodes may also be fabricated of Mo or Zr. The cathode, which is preferably UC-ZrC, may be fabricated from UC, $UO_2$, ceremets, UC-WC, UC-TaC, or UC-C. The approximate properties of UC and UC-ZrC (ZrC 25% by weight) are shown in Table I.

TABLE I

|  | UC | UC-ZrC |
|---|---|---|
| Density (gm./cc.) | 13.63 | 10.5 |
| Melting point, °C | 2,400 | 2,900 |
| Thermal conductivity (B.t.u./hr.-ft.²-° F./ft.) | 14 | 20 |
| Resistance to thermal shock | Good | Good |
| Frangibility | Good | Good |
| Thermal cycle behavior | Good | Good |
| Uranium content (gm./cc.) | 12.97 | 7.5 |

The thermionic element shown in FIGURE 3 is the type used in the first circuit. The thermionic element used in the pump circuit is the same as shown in FIGURE 3, except that only three cathodes about 3.3 in. long and three anodes series connected are used. The cathodes and anodes of the nine elements constituting the pump circuit are connected in series-parallel to provide a high amperage output (3 volts and 1000 amps.) for driving the pump. The cathode radius for these elements is reduced to 0.21 in. and the anode thickness is increased to 0.05 in. in order to accommodate the higher current. The remaining components, sleeve 21, insulation 25, and end disks 31, and interelectrode spacing are essentially the same as in the embodiment shown. The conducting disks 43 and 47, as well as the output and input leads 35 and 60, are also made heavier for the high amperage circuit. A separate cesium vapor supply is also provided and functions in the same manner as that described above.

Figure 5:
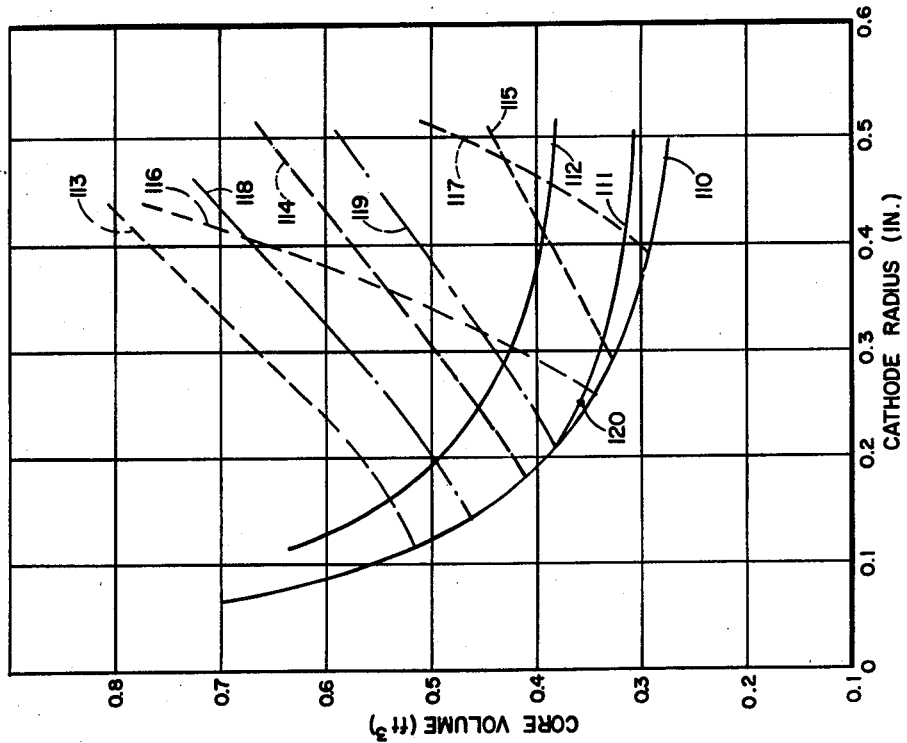
FIGURE 5 is a graph of core size as a function of cathode radius.

FIGURE 5 shows the effect of the limiting parameters on the thermionic reactor core size, i.e., cathode radius, as a function of core volume in terms of four main variables: cathode emission current density; cathode temperature; anode work function; and the ratio of heat radiation to electron emitting area multiplied by the effective total emissivity of the cathode-anode system. The anode work function provided by cesium, the preferred vapor, is 1.7 e.v. and the ratio of heat to electron emitting area times effective emissity is about 0.1. Specifically, curve 110 shows the minimum critical core size, while curves 111 and 112 show increase in size based upon 1 atom percent burnup and 0.8 atom percent burnup, respectively. The family of curves 113, 114, and 115 are based upon emission current densities giving 15, 20, and 30 watts/cm.², respectively. The family of curves 116 and 117 are both based upon a temperature drop within the cathode of 400° F. with heat conduction coefficients of 10 and 20 B.t.u./hr.-ft.-° F., respectively. The family of curves 118 and 119 show the maximum heat flux values of $2.3 \times 10^5$ and $3 \times 10^5$ B.t.u./hr.-ft.². These four families of curves establish the main parametric interrelationship by which a reactor core is chosen. Thus, in the preferred embodiment a core volume of about 0.35 ft.³, burnup of one atom percent, a maximum heat flux of $3.2 \times 10^5$, an emission current density giving 31 watts/cm.² and a heat conduction coefficient of about 10 B.t.u./hr.-ft.-° F. (the value assumed for 90% UC:10% ZrC) establish a point 120 on the graph of FIGURE 5 for the preferred embodiment. The dimensions of the pump circuit components are dictated by the electrical considerations primarily and are not significant to the determination of core volume except for the small amount of uranium contained within the pump power elements.

Figure 6:
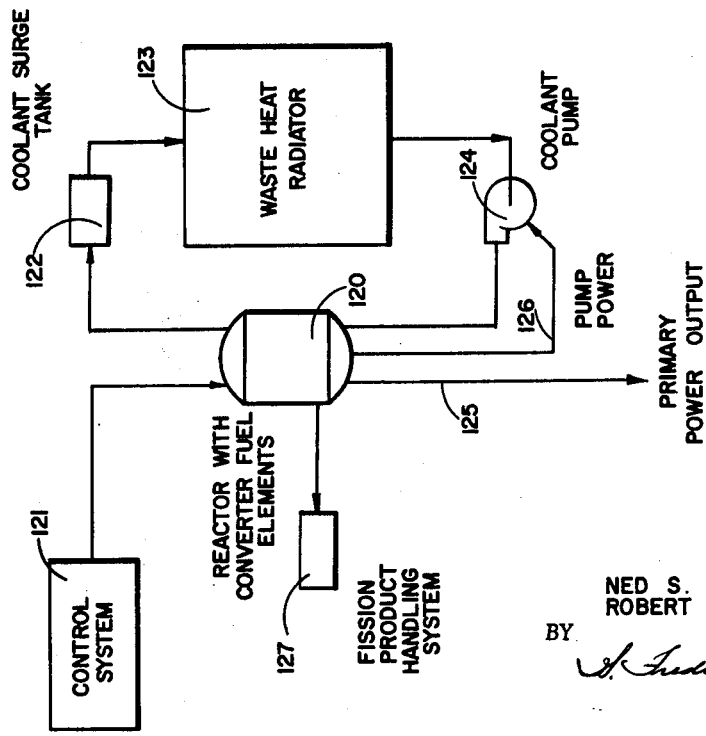
FIGURE 6 is a schematic diagram of the reactor system of the preferred embodiment.

The heat removal system for the preferred embodiment is shown schematically in FIGURE 6. The reactor 120 is controlled by control system 121. The sodium coolant passes out of the reactor 120 through a coolant surge tank 122 and into a radiator 123 where heat is rejected to space. The coolant enters radiator 123 at 1500° F. and is reduced to 1300° F. in the radiator. It is then passed through Faraday pump 124 and back to the reactor, entering the reactor at 1300° F. In the preferred embodiment the heat liberated in the radiator 123 is waste heat. The primary power output 125 is the output of the series circuit, while the pump power output 126 is the high amperage pump power circuit delivering 27 kw. of power, of which about two-thirds is dissipated within the reactor as joule heat. The fission gas removal system referred to above is shown at 127.

The primary power output 125 in the preferred embodiment is a 1000 volt, 300 amp output. This output may be changed to 12,000 volt. D.C. for use in ion propulsion systems through a circuit of 12 capacitors which are charged in parallel from the 1000 volt source and then switched to a series circuit so that the output voltage is the sum of the voltage of each capacitor. The output of this circuit will be a series of high voltage pulses at a pulse rate corresponding to the switching frequency of the solid state elements across the capacitors. A more conventional system utilizing an inverter to obtain 1000 volts at 3200 c.p.s., which is stepped up to 12,000 volts by a transformer and rectified to deliver 12,000 volts D.C. to an ion propulsion system, may also be utilized. A conventional 115 volt, 3200 c.p.s. output may be obtained by appropriately tapping and switching the transformer.

Such circuits are within the skill of the art and therefore are not described herein in detail.

The approximate operating characteristics and parameters for the preferred embodiment are shown in Table II.

TABLE II
*Approximate Parameters for Preferred Embodiment*

| | |
|---|---|
| Output | 300 kwe. |
| Amps | 300. |
| Volts | 1000. |
| Fuel | Fully enriched U. |
| Critical mass | 80 kg. $U^{235}$. |
| Composition (mixture) (cathode) | 95% UC-5% ZrC. |
| Core volume | 0.35 ft.$^3$. |
| Core height | 10 in. |
| Core diameter | 9 in. |
| Cathode temperature (maximum) | About 4000° F. |
| Anode temperature (maximum) | 1400–1600° F. |
| Coolant | Sodium. |
| Coolant inlet temperature | 1300° F. |
| Coolant outlet temperature | 1500° F. |
| Cathode surface temperature (maximum) | 3600° F. |
| Cesium vapor pressure | At 300° C. ($\sim$1 mm. HgCs). |
| Insulator disks (0.01 in. thick) | BeO. |
| Copper anode (thickness) | 0.010 in. |
| Aluminum oxide insulation (thickness) | 0.010 in. |
| Molybdenum sleeve (thickness) | 0.010 in. |
| Anode work function | 1.7 e.v. |
| Burnup for 1 year core life | 1 atom percent. |
| Reflector thickness | 2 in. |
| Maximum heat flux | $3.2 \times 10^5$ B.t.u./hr.-ft.$^2$. |
| Peak to average power distribution ratio | 1.2. |
| No. of fuel elements | 109. |
| Main circuit | 100. |
| Pump circuit | 9. |
| Fuel element (Main power circuit): | |
| No. of converter cells (diodes) | 10. |
| Diameter (outside) | 0.6 in. |
| Length | 10 in. |
| Output (per element) | 10 volts, 300 amps. |
| Fuel element (Pump circuit): | |
| No. of converter cells (diodes) | 3. |
| Diameter (outside) | 0.6 in. |
| Length | 10 in. |
| Output (per element) | 3 volts, 1000 amps. |
| Converter diodes (Main power circuit): | |
| Cathode radius | 0.25 in. |
| Cathode height (average) | 0.94 in. |
| Interelectrode spacing | 0.02 in. |
| Anode height (average) | 0.98 in. |
| Output e.m.f. (per diode) | $\sim$1 volt. |
| Emission current density (average) | 31 amps/cm$^2$. |
| Cathode density of U (7–14 gm./cc.) | 12 gm./cc. |
| Converter diodes (Pump circuit): | |
| Cathode radius | 0.21 in. |
| Cathode height | 3.3 in. |
| Interelectrode spacing | 0.02 in. |
| Output (per diode) | 1 volt. |
| Emission current density | 31 amps/cm$^2$. |
| Anode thickness | 0.05 in. |
| Cathode density of U | 12 gm./cc. |
| Faraday pump characteristics: | |
| Design flow | 175 g.p.m. |
| Pressure rise | 15 p.s.i. |
| Total current required | 1000 amps. |
| Voltage drop | 9 volts. |
| Total weight | 200 lbs. |
| Core weight | 400 lbs. |
| Radiator weight | 550 lbs. |

Figure 7:
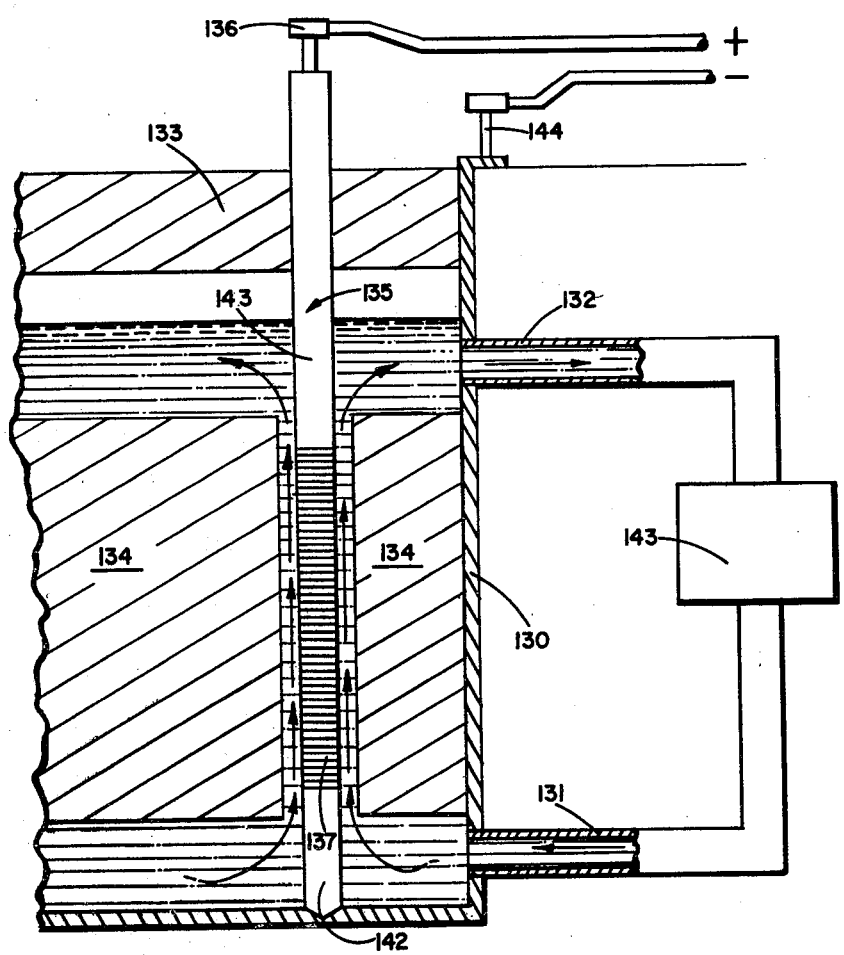
FIGURE 7 is a sectional schematic view of another embodiment of a reactor of the present invention.
Figure 8:
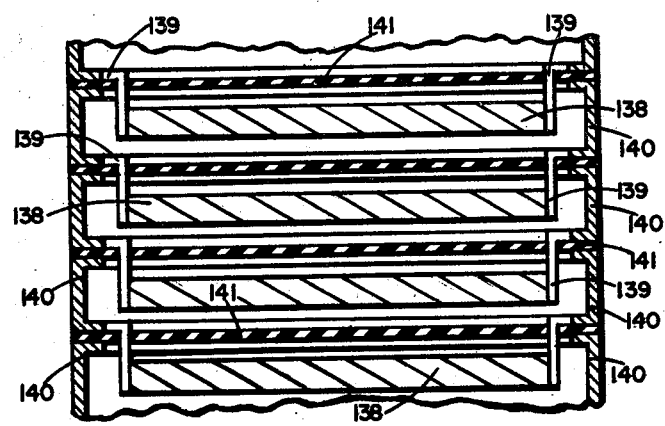
FIGURE 8 is a sectional view of another embodiment of a thermionic fuel element.

The preferred embodiment has been described with particular emphasis on space probe applications. However, stationary, remote location power plants have many of the requirements of the preferred embodiment, e.g., trouble-free operation, simplified mechanical components, compact size, light weight, etc. The second embodiment is shown schematically in FIGURE 7 and is described with reference to a sodium graphite reactor, water cooled reactor, or an organic moderated and cooled reactor. The reactor consists of a vessel 130 having a coolant inlet 131, coolant outlet 132, a top shield 133, a moderator 134 which is preferably solid, and a plurality of thermionic fuel elements 135 extending through the top shield 133 and having the coolant passing over its outside surface. The fuel element 135 has an electrical output connection 136 at its top and contains a plurality of diodes or individual thermionic cells 137. The individual cells are shown in FIGURE 8 and consist of a fueled cathode disk of UC-ZrC 138 supported on cathode leads 139, and an anode ring 140. The leads 139 connect the cathode to the anode of the next diode so that a series connection between diodes is obtained. The anodes of each diode are separated by a disk of insulator 141. Each diode in this embodiment has a sealed-in atmosphere of ionizable gas, e.g., cesium, at a vapor pressure corresponding to about 300° C. In this manner the fuel elements 135 may be individually removed and replaced merely by disconnecting the output lead 136. The diodes may be sealed together by conventional ceramic-to-metal bonding to form a single self-supporting unit between the lower support fixture 142 and the upper guide fixture 143. The electrical connections are made between the vessel 130 and the bottom diode and the output lead 136 and the vessel ground connection 144. The coolant passes out through outlet 132 and through a conversion system 143, where steam is generated which drives a turbine, thereby producing additional electricity.

In this embodiment no insulator sleeve 25 nor corrosion protection sleeve 21 is utilized for the nonconducting organic fluid. If the sodium graphite reactor core arrangement is used, then these sleeves would be required. A reactor utilizing a nonconducting coolant would have the approximate performance characteristics and parameters shown in Table III, based upon an anode work function of 1.7 e.v., a heat-shielding ratio of 2, and an emission current density of 10 amps/cm.$^2$.

TABLE III

| | |
|---|---|
| Converter element (each diode): | |
| Full load E.M.F. | 1 volt. |
| Current | 250 amps. |
| Electrical power output | ¼ kw. |
| Thermal efficiency | 25%. |
| Cathode temperature | 2000° C. |
| Coolant temperature, inlet | 600° C. |
| Coolant temperature, outlet | 800° C. |
| Insulator disk thickness | 1/32 in. |
| Cathode diameter | 1⅝ in. |
| Cathode thickness | ⅛ in. |
| Anode height | 5/16 in. |
| Cathode lead (3) | 0.04 × ⅛ in. wide. |
| Anode diameter | 2 in. |
| Electrical power per unit length of column | 1.75 kw./in. |
| Heat rejected per unit length of column | 2.25 kw./in. |
| Converter column: | |
| Length | 10 ft. |
| Diameter | 2 in. |
| No. of converter elements | 360. |
| Full load E.M.F. | 360 volts. |
| Current | 250 amps. |
| Electrical power output | 90 kw. |
| Heat rejected | 270 kw. |

The thickness-to-diameter ratio of the cathode disk of this embodiment is chosen to provide a heat-shielded cathode, i.e., having a substantially larger electron emitting area than effective heat-radiating area. This heat shielding may also be achieved by convoluting the surface of the cathode disk. In this manner the thickness of the disk 138 can be greatly increased and the fuel density of the converter column substantially improved. The fuel density required for the reactor of this embodiment would be the order of three times that of the low enrichment sodium reactor experiment. Thus high enrichment would not be necessary in this embodiment.

If a conventional high temperature steam cycle is added to the reactor of this embodiment to utilize the waste heat, the overall efficiency of the reactor plant could be increased to the order of 50 percent.

Although a particular embodiment of the present invention has been described, various modifications will be apparent to those skilled in the art. Therefore, the present invention is not limited to the specific embodiment disclosed but only by the appended claims.

What is claimed is:

1. A thermionic fuel element comprising a heat transfer sleeve; an electrical insulation sleeve on the inside surface of said heat transfer sleeve; a plurality of hollow anodes; means for supporting said anodes in spaced relationship within said insulation sleeve, said means including a plurality of electrical insulation disks dividing the volume within said sleeves into a plurality of compartments; a cathode containing fissionable material in each of said compartments in spaced relationship with its associated anode; means for series connecting said cathodes and anodes, said means supporting said cathodes in spaced relationship with said disks; an ionizable gas in said compartments; and means for passing said gas through said compartments to remove fission gases from said compartments.

2. A nuclear reactor comprising a core; means for converting fission heat generated in said core to electricity within said core, said means including a plurality of thermionic fuel elements, each of said fuel elements including a fissionable cathode, an anode spaced from said cathode, and an ionizable gas between said cathode and anode; means connecting said cathodes and anodes within each fuel element in electrical series; means for connecting said fuel elements in electrical series; and means for flowing said ionizable gas through said fuel element series.

3. A nuclear reactor comprising a core, a plurality of fuel elements in said core, each of said fuel elements having a fissionable cathode and an anode; means for passing an ionizable gas through said fuel elements including a duct series connecting said fuel elements; means for electrically series connecting said fuel elements including an electrical conductor adjacent said duct; and means including said ionizable gas and said duct for removing gaseous fission products from said fuel elements and said core.

4. A nuclear reactor comprising a core; means for directly converting heat liberated in said core to electricity including a plurality of thermionic fuel elements, each of said fuel elements containing at least one fissionable-material-containing cathode, an anode and an ionizable gas, at least one group of said thermionic fuel elements electrically series connected; load means connected to said at least one group; and means for flowing said ionizable gas through said fuel elements of said group.

5. A nuclear reactor comprising a core; means for directly converting heat liberated in said core to electricity including a plurality of thermionic fuel elements including two independent groups of thermionic fuel elements, each of said groups having a means for flowing an ionizable gas through the fuel elements of its associated group, each of said fuel elements containing at least one fissionable-material-containing cathode, an anode and an ionizable gas, at least one group of said thermionic fuel elements electrically series connected; and load means connected to said at least one group.

References Cited in the file of this patent

UNITED STATES PATENTS

| | | |
|---|---|---|
| 2,728,867 | Wilson | Dec. 27, 1955 |
| 2,758,225 | Annis et al. | Aug. 7, 1956 |
| 2,798,848 | Kingdom | July 9, 1957 |
| 2,799,642 | Hurwitz et al. | July 16, 1957 |
| 2,851,409 | Moore | Sept. 9, 1958 |
| 2,864,012 | Thomas et al. | Dec. 9, 1958 |
| 2,900,535 | Thomas | Aug. 18, 1959 |
| 2,902,423 | Luebke et al. | Sept. 1, 1959 |

FOREIGN PATENTS

| | | |
|---|---|---|
| 618,508 | Great Britain | Feb. 23, 1949 |

OTHER REFERENCES

Nucleonics, Vol. 17, No. 7, July 1959, pages 49–55.